US012770048B2

(12) United States Patent
Sankar et al.

(10) Patent No.: US 12,770,048 B2
(45) Date of Patent: Oct. 20, 2026

(54) METHODS AND SYSTEMS FOR QUANTUM ERROR CORRECTION

(71) Applicant: 1QB Information Technologies Inc., North Vancouver (CA)

(72) Inventors: Krishanu Sankar, Vancouver (CA); Pooya Ronagh, Guelph (CA)

(73) Assignee: 1QB INFORMATION TECHNOLOGIES, INC., Vancouver (CA)

( * ) Notice: Subject to any disclaimer, the term of this patent is extended or adjusted under 35 U.S.C. 154(b) by 36 days.

(21) Appl. No.: 18/941,895

(22) Filed: Nov. 8, 2024

(65) Prior Publication Data

US 2025/0068958 A1 Feb. 27, 2025

Related U.S. Application Data

(63) Continuation of application No. PCT/IB2023/054723, filed on May 5, 2023.

(60) Provisional application No. 63/339,838, filed on May 9, 2022.

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ............................... G06N 10/70; G06N 10/20
USPC .................................................. 714/785, 799
See application file for complete search history.

(56) References Cited

U.S. PATENT DOCUMENTS

| | | | | |
|---|---|---|---|---|
| 11,580,436 | B2 * | 2/2023 | Chamberland | H04B 10/00 |
| 2014/0365843 | A1 * | 12/2014 | Ashikhmin | H03M 13/1148 714/758 |
| 2016/0125311 | A1 * | 5/2016 | Fuechsle | H10N 69/00 257/31 |
| 2021/0099201 | A1 | 4/2021 | Winick et al. | |
| 2021/0124640 | A1 * | 4/2021 | Nickerson | G06F 11/10 |
| 2021/0125094 | A1 * | 4/2021 | Chamberland | G06N 10/20 |
| 2021/0304052 | A1 * | 9/2021 | Pant | G06N 3/08 |
| 2022/0101172 | A1 | 3/2022 | Lee et al. | |
| 2022/0198312 | A1 * | 6/2022 | Delfosse | G06F 11/1048 |
| 2022/0216884 | A1 * | 7/2022 | Delfosse | H03M 13/1111 |
| 2022/0269963 | A1 * | 8/2022 | Delfosse | G06F 16/9024 |
| 2024/0160988 | A1 * | 5/2024 | Barber | G06N 10/70 |
| 2024/0169246 | A1 * | 5/2024 | Barber | G06N 10/70 |

(Continued)

FOREIGN PATENT DOCUMENTS

| | | | |
|---|---|---|---|
| CN | 115545204 | A | 12/2022 |
| WO | WO-2020188240 | A1 | 9/2020 |

(Continued)

OTHER PUBLICATIONS

Andreasson, Philip. et al. Quantum error correction for the toric code using deep reinforcement learning. Quantum arXiv preprint arXiv:1811.12338v3 3:1-12 (2019).

(Continued)

*Primary Examiner* — John J Tabone, Jr.
(74) *Attorney, Agent, or Firm* — WILSON SONSINI GOODRICH & ROSATI

(57) ABSTRACT

Methods and systems for quantum error correction on a quantum computer are provided. A quantum computer may comprise syndrome qubits, data qubits, and a plurality of quantum gates acting on the syndrome qubits and the data qubits.

17 Claims, 6 Drawing Sheets

(56) References Cited

U.S. PATENT DOCUMENTS

| | | | | |
|---|---|---|---|---|
| 2024/0311673 | A1* | 9/2024 | Salim | G06N 3/09 |
| 2025/0068958 | A1* | 2/2025 | Sankar | G06N 10/70 |
| 2026/0030532 | A1* | 1/2026 | Kulchytskyy | G06N 10/20 |

FOREIGN PATENT DOCUMENTS

| | | | |
|---|---|---|---|
| WO | WO-2023218310 | A1 | 11/2023 |
| WO | WO-2024150142 | A1 | 7/2024 |
| WO | WO-2024201378 | A1 | 10/2024 |

OTHER PUBLICATIONS

Arrazola, J.M. et al. Quantum circuits with many photons on a programmable nanophotonic chip. Nature 591(7848):54-60 (2021).
Bertoni, A. et al. Quantum logic gates based on coherent electron transport in quantum wires. Physical review letters 84(25):5912-5915 (2000).
Bombin, Hector, and Miguel Angel Martin-Delgado. Topological quantum distillation. Physical review letters 97(18):180501, 1-4 (2006).
Burell, Zachary. et al. An Introduction to Quantum Computing using Cavity QED concepts. arXiv preprint arXiv:1210.6512, 1-53 (2012).
Byrnes, Tim. et al. Macroscopic Quantum Computation using Bose-Einstein Condensates. arXiv preprint arXiv:1103.5512v1, 1-10 (2011).
Calderbank. A. Robert, and Peter W. Shor. Good quantum error-correcting codes exist. Phys Rev A 54(2):1098-1105 (1996).
Chamberland, Christopher. et al. Building a fault-tolerant quantum computer using concatenated cat codes. PRX Quantum 3(1):010329, 1-117 (2022).
Chamberland, Christopher. et al. Triangular color codes on trivalent graphs with flag qubits. New Journal of Physics 22(2):023019, 1-24 (2020).
Clarke, John, and Frank K Wilhelm. Superconducting quantum bits. Nature 453(7198):1031-1042 (2008).
Cory, David G. et al. Nuclear Magnetic Resonance Spectroscopy: An Experimentally Accessible Paradigm for Quantum Computing. arXiv preprint arXiv:quant-ph/9709001, 1-27 (1997).
Das, Poulami. et al. A scalable decoder micro-architecture for fault-tolerant quantum computing. arXiv preprint arXiv:2001.06598, 1-19 (2020).
Das, Sreerupa, and Michael C. Mozer. A unified gradient-descent/clustering architecture for finite state machine induction. Advances in neural information processing systems 6:19-26 (1993).
Delfosse, Nicolas, and Naomi H. Nickerson. Almost-linear time decoding algorithm for topological codes. arXiv:1709.06218v3, 1-12 (2017).
Delfosse, Nicolas, Vivien Londe, and Michael E. Beverland. Toward a union-find decoder for quantum LDPC codes. IEEE Transactions on Information Theory 68(5):3187-3199 (2022).
Deutsch, Ivan H. et al. Quantum Computing with Neutral Atoms in an Optical Lattice. Fortschritte der Physik—Progress of Physics 48(9-11):1-29 (2000).
Emerson, Joseph. et al. Scalable noise estimation with random unitary operators. Journal of Optics B: Quantum and Semiclassical Optics 7(10):S347-S352 (2005).
Fedichkin, L. et al. Novel Coherent Quantum Bit using Spatial Quantization Levels in Semiconductor Quantum Dot. arXiv preprint arXiv:quant-ph/0006097, 1-30 (2000).
Fowler, A.G. Minimum weight perfect matching in O (1) parallel time. arXiv:1307.1740v2, 1-7 (2013).
Fujisaki, Jun. et al. A Practical and Scalable Decoder for Topological Quantum Error Correction with Digital Annealer. arXiv preprint arXiv:2203.15304 :1-12 (2022).
Gheorghiu, V. Standard form of qudit stabilizer groups. arXiv preprint arXiv:1101.1519 (2011).
Gottesman, D. An Introduction to Quantum Error Correction and Fault-Tolerant Quantum Computation. arXiv preprint arXiv:0904.2557 (2009).
Gottesman, Daniel. et al. Encoding a qubit in an oscillator. Physical Review A 64(1):012310, 1-21 (2001).
Harneit, Wolfgang. Spin quantum computing with endohedral fullerenes. Springer arXiv preprint arXiv:1708.09298, 1-24 (2017).
Hopcroft, John. An n log n algorithm for minimizing states in a finite automaton. Theory of machines and computations. Academic Press :189-196 (1971).
Huang, Hsin-Yuan. et al. Predicting many properties of a quantum system from very few measurements. Nature Physics 16(10):1050-1057 (2020).
Huang, Shilin. et al. Fault-tolerant weighted union-find decoding on the toric code. Physical Review A 102(1):012419, 1-6 (2020).
Imamoglu, A. et al. Quantum information processing using quantum dot spins and cavity QED. Physical review letters 83(20):4204-4207 (1999).
Inui, Yoshitaka, and Yoshihisa Yamamoto. Entanglement and quantum discord in optically coupled coherent Ising machines. Physical Review A 102(6):062419, 1-15 (2020).
Kane, B. E. A Silicon-based Nuclear Spin Quantum Computer. Nature 393(6681):133-137 (1998).
Kielpinski, D. et al. Architecture for a large-scale ion-trap quantum computer. Nature 417(6890):709-711 (2002).
Knill, E. et al. Efficient Linear Optics Quantum Computation. arXiv preprint arXiv:quant-ph/0006088, 1-8 (2000).
Kubica, Aleksander, and Nicolas Delfosse. et al. Efficient color code decoders in d=2 dimensions from toric code decoders. arXiv preprint arXiv:1905.07393, 1-19 (2019).
Leuenberger, M N, and D Loss. Quantum computing in molecular magnets. Nature 410(6830):789-793 (2001).
Lyon, S.A. Spin-based Quantum Computing Using Electrons on Liquid Helium. arXiv preprint arXiv:cond-mat/0301581, 1-12 (2006).
Merrill, William, and Nikolaos Tsilivis. Extracting finite automata from RNNs using state merging. arXiv preprint arXiv:2201.12451: 1-12 (2022).
Michael, Marios H. et al. New class of quantum error-correcting codes for a bosonic mode. Physical Review X 6(3):031006, 1-26 (2016).
Nafradi, Balint. et al. Room Temperature Manipulation of Long Lifetime Spins in Metallic-like Carbon Nanospheres. Nature Communications 7:12232, 1-8 (2016).
Nayak, Chetan. et al. Non-Abelian Anyons and Topological Quantum Computation. arXiv preprint arXiv:0707.1889v2, 1-73 (2008).
Nielsen, Erik. et al. Gate Set Tomography. Quantum arXiv:2009.07301v2 5:1-59 (2021).
Nielsen, Michael A, and Isaac L. Chuang. et al. Quantum Computation and Quantum Information. Cambridge University Press (2000).
Nizovtsev, A.P. et al. A quantum computer based on NV centers in diamond: optically detected nutations of single electron and nuclear spins. Optics and spectroscopy 99(2):233-244 (2005).
O'Brien, Jeremy L. et al. Photonic quantum technologies. Nature Photonics 3:687-695 (2009).
Ohlsson, Nicklas. et al. Quantum Computer Hardware Based on Rare-earth-ion-Doped inorganic crystals. Optics Communications 201(1-3):71-77 (2002).
PCT/IB2023/054723 International Search Report and Written Opinion dated Jul. 19, 2023.
PCT/IB2024/050222 International Search Report and Written Opinion dated Apr. 17, 2024.
PCT/IB2024/053046 International Search Report and Written Opinion dated Jul. 5, 2024.
Resch, Salonik, and Ulya R. Karpuzcu. Benchmarking quantum computers and the impact of quantum noise. ACM Computing Surveys arXiv preprint arXiv:1912.00546v5 54(7):1-37 (2021).
Sarovar, Mohan. et al. Detecting crosstalk errors in quantum information processors. Quantum arXiv preprint arXiv:1908.09855v3 4:1-36 (2020).
Seo, Seungchan, and Joonwoo Bae. Measurement crosstalk errors in cloud-based quantum computing. IEEE Internet Computing arXiv preprint arXiv:2112.00984v1 26(1):26-33 (2021).
Steane, Andrew M. Error Correcting Codes in Quantum Theory. Phys Rev Lett 77(5):793-797 (1996).

(56) References Cited

OTHER PUBLICATIONS

Sun, Shuo. et al. A Single-photon Switch and Transistor Enabled by a Solid-state Quantum Memory. arXiv preprint arXiv:1805.01964, 1-26 (2018).
Yanagimoto, Ryotatsu. et al. Embedding entanglement generation within a measurement-feedback coherent Ising machine. arXiv preprint arXiv:1906.04902v1, 1-11 (2019).
Nielsen, et al. Quantum Computation and Quantum Information. Chapter 10: Quantum error-correction. Cambridge University Press. pp. 425-499. (2000).

* cited by examiner

METHODS AND SYSTEMS FOR QUANTUM ERROR CORRECTION

CROSS-REFERENCE TO RELATED APPLICATIONS

This application is a continuation of International Application PCT/IB2023/054723, filed May 5, 2023, which claims the benefit of U.S. Provisional Patent Application No. 63/339,838 filed May 9, 2022, which are incorporated herein by reference in their entireties.

BACKGROUND

To realize practical applications of quantum computers, there is a need to create logical qubits and quantum gates whose error rates are suitably low. One path towards achieving these low error rates is through quantum error correction, which is a method for creating logical qubits and quantum gates which are more reliable than their physical component parts. However, quantum error correction may induce an overhead cost in terms of computational time and physical resources.

SUMMARY

The present disclosure provides methods and systems for quantum error correction. Building a working quantum error correction scheme presents various challenges, among which is that of creating an effective decoder. Methods and systems disclosed herein may use the clustering procedure with a message-passing subroutine for a color code. The present disclosure may improve upon existing methods for quantum error correction in at least some aspects by using the clustering procedure with a message-passing subroutine for a color code.

An advantage of the methods and systems disclosed herein is that they allow for the application of the clustering procedure with a message-passing subroutine as a subroutine in decoding the color code in a manner that is fault-tolerant.

An advantage of the methods and systems disclosed herein is that they are built on simple instruction-based logic which is implementable in a cryogenic setting.

Another advantage of the methods disclosed herein is that they are scalable for large code distances. The methods disclosed herein are highly repeatable, consequently using them for large code distances may not be harder than for small code distances.

Another advantage of the methods and systems disclosed herein is that they are fast and show high accuracy.

In an aspect, disclosed herein is a method for quantum error correction on a quantum computer, the quantum computer comprising syndrome qubits, data qubits, and a plurality of quantum gates acting on the syndrome qubits and the data qubits, the method comprising: performing one or more syndrome qubit measurements; obtaining an indication of a vertex-colored graph, said vertex-colored graph having (i) vertices each representative of a location of a syndrome qubit within said syndrome qubits and a measurement time, or of a boundary of a color code and (ii) weighted edges representing one or more patterns of erroneous events; using said syndrome qubits measurements to form a group of marked vertices of said vertex-colored graph; using a clustering procedure with a message-passing subroutine involving said marked vertices to form a group of selected edges; using said group of selected edges to identify one or more data qubits for correction to form a set of identified data qubits; and using said set of identified data qubits to prescribe a recovery operation for quantum error correction.

In another aspect, disclosed herein is a system for quantum error correction using a clustering procedure with a message-passing subroutine for a color code, the system comprising: a non-classical computer having (i) a quantum chip comprising a color code comprising syndrome qubits, data qubits, and quantum gates acting on the syndrome qubits and the data qubits, and (ii) a control readout system; a digital computer operatively coupled to the quantum computer, the digital computer comprising a memory having instructions to at least instruct said quantum computer to perform one or more syndrome qubit measurements; obtain an indication of a vertex-colored graph; form a group of marked vertices of said vertex-colored graph; form a group of selected edges; form a set of identified data qubits; a recovery operation for quantum error correction; and instruct said quantum chip with said recovery operation.

Another aspect of the present disclosure provides a system comprising one or more computer processors and a computer memory coupled thereto. The computer memory comprises machine executable code that, upon execution by the one or more computer processors, implements any of the methods described above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
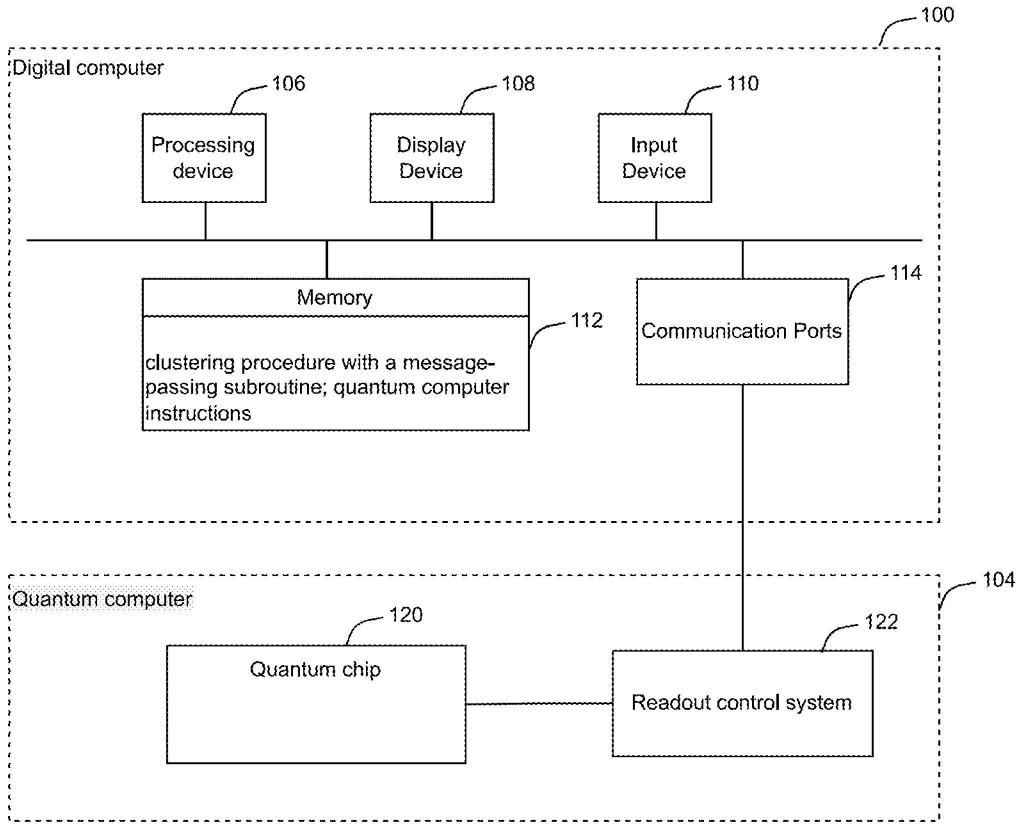
FIG. 1 is a diagram of an example system for quantum error correction using the clustering procedure with a message-passing subroutine for a color code.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every subrange and value within the range is present as if explicitly written out. The term "about" or "approximately" may mean within an acceptable error range for the particular value, which will depend in part on how the value is measured or determined, e.g., due to the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

As used herein, the term "classical," as used in the context of computing or computation, generally refers to computation performed using discrete bits without use of quantum mechanical superposition and/or quantum mechanical entanglement. A classical computer may use binary values. A classical computer may be a digital computer, such as a computer employing discrete bits (e.g., 0's and 1's) without use of quantum mechanical superposition and/or quantum mechanical entanglement.

As used herein, the term "non-classical," as used in the context of computing or computation, generally refers to any method or system for performing computational procedures outside of the paradigm of classical computing.

As used herein, the term "quantum device" generally refers to any device or system to perform computations using quantum mechanical phenomenon such as quantum mechanical superposition and/or quantum mechanical entanglement.

As used herein, the terms "quantum computation," "quantum procedure," "quantum operation," and "quantum computer" generally refer to any method or system for performing computations using quantum mechanical operations (e.g., unitary transformations or completely positive trace-preserving (CPTP) maps on quantum channels) on a Hilbert space represented by a quantum device.

As used herein, the term "qubit" generally refers to a unit of quantum information processing whose quantum state is a complex unit vector of dimension 2. These two dimensions may be referred to as "0" and "1".

As used herein, the term "quantum gate" generally refers to a manipulation of qubits that can be represented by a unitary operation on the quantum state of the qubits.

As used herein, the term "quantum gate operation" generally refers to a quantum gate, a sequence of quantum gates, or a combination of quantum gates and quantum measurements that perform an isometry on the quantum state of the qubits.

As used herein, the term "syndrome qubit" generally refers to a physical qubit used in the implementation of error correcting code. In some cases, a syndrome qubit may not be a data qubit. For example, a syndrome qubit may be used to measure the stabilizers of the quantum error-correcting code.

As used herein, the term "flag qubits" generally refers to a physical qubit used to detect errors which might propagate to multiple data qubits.

As used herein, the term "qubit measurement" generally refers to a projective operation on a physical qubit with at least two possible (e.g., binary) readouts.

As used herein, the term "graph" generally refers to a set of vertices as well as a set of edges connecting some pairs of the vertices. Edges may have weights which are real numbers.

As used herein, the term "subgraph" generally refers to a subset of the vertices and edges of a given graph.

As used herein, the term "properly vertex-colored graph" generally refers to a graph along with an assignment of a color to each vertex of the graph. In some cases, the graph may be colored such that any two connected vertices have different colors.

As used herein, the term "minimum-weight perfect matching procedure" generally refers to an algorithm whose input is a weighted graph and a set of marked vertices, and whose output is a set of edges of minimal weight subject to the constraint that the edge set's boundary is the set of marked vertices.

As used herein, the term "plaquette" generally refers to the set of qubits involved in measuring a single stabilizer generator in a topological quantum error-correcting code.

As used herein, the term "stabilizer circuit" generally refers to a physical quantum circuit which is used to measure a subset of the stabilizer generators of the quantum error-correcting code. A stabilizer circuit is said to be of X-type (respectively Z-type) if it measures all of the X-type (respectively Z-type) stabilizer generators of the quantum error-correcting code.

In a quantum error-correcting code, a plurality of physical data qubits is kept in an entangled state. One or multiple logical qubits are represented as certain degrees of freedom within the Hilbert space of the data qubits, while perturbations along the other degrees of freedom are continuously measured, decoded, and then corrected. The degrees of freedom are chosen so that individual, topologically isolated errors in the code can be detected and corrected. Decoding may involve a diagnosis step of inferring which data qubits are likely erroneous based on the measured syndrome history. The process of measuring syndrome qubits, decoding, and then applying a correction may be performed many times within a single quantum circuit, and therefore it may be advantageous for it to be both fast and accurate to minimize the accumulation of errors.

A variable of importance may be the distance of the quantum error-correcting code. The overhead in terms of the number of data qubits used and the time per quantum gate is polynomial in the code distance. But in theory the error rate of the logical components may be exponential in the code distance, provided that the physical components' error rate is smaller than a fixed threshold value. Thus, by creating codes with a large code distance, lower logical error rates may be achieved. However, the decoding step may grow in difficulty as the code distance increases, and this may present a barrier to creating codes with a large distance. To make use of larger code distances, the decoder may detect strings of errors of a length up to half the code distance, which might occur. The algorithms used to do this may be complex. For example, the size and amount of training data needed to create a successful neural network-based decoder is likely to be prohibitive for large code distances.

For topological codes such as surface code and color code (see, for example, Bombin, et al., "Topological quantum distillation", *Physical Review Letters* 97, no. 18, p. 180501, 2006, which is incorporated by reference herein in its entirety), the decoding problem can be reduced to one or more instances of minimum-weight perfect matching (MWPM) problems on a graph which resembles the qubit array (more details may be found in Kubica et al., "Efficient color code decoders in d>=2 dimensions from toric code decoders", arXiv:1905.07393, 2019; and in Chamberland et al., "Triangular color codes on trivalent graphs with flag qubits", *New Journal of Physics* 22, no. 2, p. 023019, 2020, each of which is incorporated by reference herein in its entirety).

In some cases, exact approaches to MWPM problems such as the blossom algorithm are generally of high complexity and may run slowly when used for large code distances. One recently proposed solution to this problem is the Union-Find algorithm described by Delfosse et al., "Almost-linear time decoding algorithm for topological codes", arXiv:1709.06218, 2017, which is incorporated by reference herein in its entirety, and which is an approximate algorithm for MWPM problems whose runtime scales almost linearly in the graph size. The Union-Find algorithm has been shown to perform well in decoding the toric code by Huang et al., "Fault-tolerant weighted union-find decoding on the toric code", *Physical Review A* 102, no. 1, p. 012419, 2020, which is incorporated by reference herein in its entirety.

Quantum Error Correction

Quantum error correction comprises methods for reducing error rates in quantum computations. In some cases, quantum error correction may comprise using a plurality of physical qubits and gates to encode and use one or more resulting logical qubits with lower error rates than those of the constituent physical qubits and gates. At the heart of quantum error correction is a "quantum error-correcting code". Quantum error-correcting code may comprise several parameters: the number of data qubits (denoted by n), the number of logical qubits (denoted by k), and the smallest number of errors relating any two code states (called the code distance and denoted by d). The code states may form a distinguished subspace of the full Hilbert space of joint states of the data qubits, and error correction comprises detecting and correcting errors which move the joint data qubit state out of the code space.

Quantum error-correcting codes are an extension of the classical concept of error correcting codes, which can encode one or more logical bits using many low-fidelity bits by correcting bit-flip errors.

A class of quantum error-correcting code s is given by stabilizer codes. The stabilizer formalism is as follows. An abelian subgroup K of the n-qubit Pauli group is chosen; this is called the stabilizer subgroup. A set of generators A_1, A_2, . . . , A_k is chosen for K. The code space is the space of states of the data qubits which are stabilized by A, i.e., eigenstates of eigenvalue +1. The code space therefore encodes n−k logical qubits. Simultaneously measuring each of the stabilizers A_1, A_2, . . . , A_k projects the data state to the code space. (For more details, see Gheorghiu, "Standard form of qudit stabilizer groups", *Physics Letters A* 378, no. 5-6, pp. 505-5, 2014 and Gottesman, "An introduction to quantum error correction and fault-tolerant quantum computation", in *Quantum information science and its contributions to mathematics, Proceedings of Symposia in Applied Mathematics,* 68, pp. 13-58, 2010, which are incorporated by reference herein in their entirety.)

One of the examples of stabilizer codes are Calderbank-Shor-Steane (CSS) codes. CSS codes are defined using the CSS construction, which produces a single quantum error-correcting code from two nested linear error-correcting codes, C'<C, with the same number of data bits. The logical qubit is encoded within the subquotient C/C'. The reason this construction produces a quantum error-correcting code is that (1) the ability to correct both Pauli X (bit-flip) errors and Pauli Z (phase-flip) errors enables full quantum error correction, and (2) application of the Hadamard gate flips a code to its dual, and interchanges X errors for Z errors. For CSS codes, each stabilizer generator is either of X-type or of Z-type. (For examples, see Chapter 10 of Nielson et al., "Quantum Computation and Quantum Information", Cambridge University Press, New York, 2000, which is incorporated by reference herein in its entirety.

In an example, quantum error correction proceeds as follows. At regular time intervals, syndrome extraction circuits comprising data qubits and syndrome qubits are executed. Such a syndrome extraction circuit may comprise a sequence of physical qubit gates followed by a measurement which produces readouts from the syndrome qubits, and, in the absence of substantial errors, provides the result of the measurement to the corresponding stabilizer. This collection of readouts is referred to as a syndrome. This process is repeated several times to produce a syndrome history. This syndrome history provides incomplete information about the error which has occurred, and is sent to the classical decoder which infers the most likely error which may be afflicting the data qubits. The decoder returns a candidate recovery operation, which is then either applied to the data qubits or is stored. Various classical algorithms have been developed to perform efficient and accurate decoding, depending on the code used. (More details can be found in Chamberland et al., "Triangular color codes on trivalent graphs with flag qubits", *New Journal of Physics* 22, no. 2, p. 023019, 2020; Kubica et al., "Efficient color code decoders in d≥2 dimensions from toric code decoders", arXiv: 1905.07393, 2019; and Delfosse et al., "Almost-linear time decoding algorithm for topological codes", arXiv: 1709.06218, 2017, each of which is incorporated herein by reference in its entirety).

Color Code

The term "topological quantum error-correcting code" refers to a stabilizer code whose data qubits are placed in some geometrical configuration and whose stabilizer operations obey some form of locality. Color codes form a class of topological codes used in quantum error correction. In an example, a color code may be a topological code where the X-type stabilizers and the Z-type stabilizers coincide, such as, for example, the color codes described by Bombin et al., "Topological quantum distillation", *Physical Review Letters* 97, no. 18, p. 180501, 2006, which is incorporated by reference herein in its entirety. In some cases, a color code is a two-dimensional color code. In some cases, a color code is a higher-dimensional color code. In two-dimensional color codes, the data qubits lie at the vertices of a planar graph, and the faces of the graph are called plaquettes. In topological codes, the plaquettes relate to the stabilizer generators. In some cases, in the color code, each plaquette has two associated stabilizer generators. Each plaquette may have a corresponding X-type stabilizer generator which acts by the Pauli operation X on the data qubits bordering that plaquette. Each plaquette may have a corresponding Z-type stabilizer generator which acts by the Pauli operation Z on the data qubits bordering that plaquette.

In an example, each plaquette may have a single syndrome qubit placed at its center, and this syndrome qubit may be used to measure the stabilizer generators corresponding to that plaquette. In some examples, there may be two syndrome qubits within a plaquette, each used to measure one of the two different stabilizer generators corresponding to that plaquette. Each plaquette may also have one or more flag qubits placed inside it, which are used in the quantum circuit which measures the stabilizer generators, and whose measurement outcomes may indicate faults which may have occurred. Each vertex may border at most three plaquettes, so the plaquettes are colored with three colors (which may be referred to as red, blue, and green) such that no two adjacent plaquettes have the same color. In some cases, each boundary of the code is bordered by plaquettes of two different colors, and the boundary is then considered to be of the third color. In some cases, the colors may not be important for the definition of the code, but the colors are used in its analysis and decoding. An example of a class of color codes is the [6, 6, 6] color code whose red, blue, and green plaquettes are all hexagonal. When these hexagonal plaquettes are used to tile a triangular patch, we obtain the so-called triangular color code.

Figure 4:
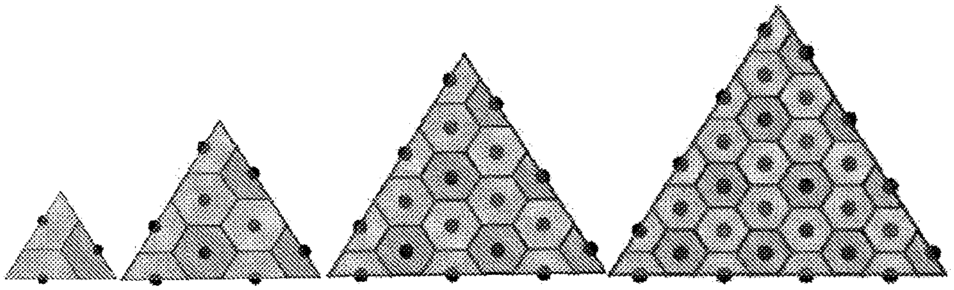
FIG. 4 is an example of triangular color codes with code distances 3, 5, 7, and 9 (from left to right), with the syndrome qubit locations marked with circles, and the plaquettes being colored.

Now referring to FIG. 4, there is shown an example of triangular color codes with code distances 3, 5, 7, and 9. The syndrome qubit locations are marked with circles, and the plaquettes are colored.

More details may be found in Kubica et al., "Efficient color code decoders in d≥2 dimensions from toric code decoders", arXiv:1905.07393, 2019; and in Chamberland et al., "Triangular color codes on trivalent graphs with flag qubits", *New Journal of Physics* 22, no. 2, p. 023019, 2020, each of which is incorporated by reference herein in its entirety.

Minimum-Weight Perfect Matching

An MWPM problem is defined on a graph G=(V, E) with the set of vertices V partitioned into three sets M ("marked"), U ("unmarked"), and B ("boundary"). A "perfect matching" is a subset S of the set of edges E with the property that every marked vertex is an endpoint of an odd number of edges of S, and every unmarked vertex is an endpoint of an even number of edges of S. The problem of "minimum-weight perfect matching" concerns finding a perfect matching S of minimal possible size. In the case where the edges of G have associated weights, the problem concerns finding the perfect matching S with the lowest total weight. It is noted that while the problem may be defined to search for "perfect" or near-perfect matching; real solutions may be inexact subject to practical limitations of the hardware or accuracy requirements of the user. The clustering procedure with a message-passing subroutine disclosed herein is a method of finding an approximate solution to an MWPM problem.

The Restriction Decoder Algorithm for Decoding the Color Code

Decoding refers to the process of using a history of syndrome qubit measurements to deduce a recovery operator on the data qubits to correct errors present in the data qubits. For the surface code, the decoding algorithm may reduce to two MWPM problems (see, e.g., Fowler, "Minimum weight perfect matching in O(1) parallel time", arXiv:1307.1740, 2013, which is incorporated by reference herein in its entirety). For the color code, an example decoding algorithm for the code capacity noise model is described in Kubica et al., "Efficient color code decoders in d≥2 dimensions from toric code decoders", arXiv:1905.07393, 2019, which is incorporated by reference herein in its entirety, and, in a second example, a generalization of this algorithm using flag qubits for full circuit-level noise is described in Chamberland et al., "Triangular color codes on trivalent graphs with flag qubits", *New Journal of Physics* 22, no. 2, p. 023019, 2020, which is incorporated by reference herein in its entirety. This algorithm for decoding is known as the "Restriction Decoder". A costly step in the algorithm is a collection of six MWPM problems. To achieve full quantum error correction, both Pauli X-type and Pauli Z-type errors on the data qubits may be corrected, and these are treated separately in a nearly identical fashion. Only the procedure for correcting Pauli X-type errors on the data qubits is described herein; the procedure for correcting Pauli Z-type errors is the same but with every instance of "X" (resp. "Z") replaced by "Z" (resp. "X").

The dual relationship between Pauli X-type and Pauli Z-type errors may be described in the following way. A Pauli X-type error on a single physical qubit may change the outcome of a measurement in the Z-basis of the qubit, but may have no or little effect on the outcome of a measurement in the X-basis of the qubit. Therefore, detecting and correcting Pauli X-type errors on data qubits may depend on measurements in the Z-basis. In the stabilizer measurements of Z-type (resp. X-type), the syndrome qubits are measured in the Z-basis (resp. X-basis). Flag qubits may be measured in the X-basis (resp. Z-basis). Correction of the Pauli X-type errors on the data qubits may use information from the stabilizer measurements of both types, e.g., syndrome outcomes from the Z-type stabilizer measurements and flag outcomes from the X-type stabilizer measurements.

The decoding procedure may be applied to a syndrome history σ(Z, 1); σ(X, 2); σ(Z, 3); . . . ; σ(Z, 2N−1); σ(X, 2N); σ(Z, 2N+1) for some positive integer N, where σ(Z, -) denotes a stabilizer measurement of type Z, and σ(X, -) denotes a stabilizer measurement of type X (in both cases, including both syndrome qubit and flag qubit measurements). A graph G with one vertex for every ordered pair (v, t) may be constructed where v is a vertex that spans all syndrome qubit measurement locations and t is a time layer that spans all positive integers between 1 and N, inclusive. Boundary vertices ($v_R$, t), ($v_B$, t), and ($v_G$, t) correspond to the red, blue, and green boundaries, respectively. For every vertex (v, t) in the graph G where v corresponds to a syndrome qubit measurement location v, the vertex (v, t) is assigned the color of a color code plaquette containing v. And for every vertex (v, t) in graph G where v corresponds to one of the boundaries, the vertex (v, t) is assigned the color of the boundary.

To set the edges of the graph G, the concept of "selected vertices" may be used. The edges of the graph G may represent patterns of erroneous events (one type of an erroneous event is a fault) with edges' weights representing probabilities of the patterns of erroneous events. For each possible single erroneous event F, the syndrome qubit measurement outcome H(F)=σ(Z, 1); σ(X, 2); σ(Z, 3); . . . ; σ(Z, 2N−1); σ(X, 2N); σ(Z, 2N+1) may be simulated. Such an outcome results from this erroneous event. This syndrome outcome SH(F) determines a set of selected vertices, SV(H(F)), which is the set of all vertices (v, t) with the property that the measurement outcomes of v in σ(Z, 2t−1) and σ(Z, 2t+1) are different from one another. This set of selected vertices in turn determines a set of edges E(SV(H(F))) as follows: for every pair of distinct vertices in the set of selected vertices, an edge connecting the pair is constructed. In other words, two vertices of the graph G are connected by an edge if there exists an erroneous event F such that SV(H(F)) contains both vertices. The set of selected vertices has no dependency on the X-type syndromes.

The noise afflicting the syndrome extraction circuit may be modeled in various ways. For example, a model for the noise afflicting the syndrome extraction circuit, wherein single fault events occur with various probabilities, are independent, and only introduce errors locally, may be used. An example of such a noise model is a depolarizing channel, where the operations of single-qubit gates, two-qubit gates, preparation, measurement, and waiting have separate fixed probabilities of incurring random Pauli errors on the qubits acted upon by the operation. Given such a noise model, an edge representative of an erroneous event resulting from a single fault is constructed between two vertices in G. This creates a lattice-like structure of edges in the bulk of the graph, and similar edges at the boundaries of the graph may be additionally included.

For example, in the case of a depolarizing noise channel, different types of erroneous events result in edges of vertical, horizontal, diagonal, and "flag" edges. Vertical edges are edges connecting a pair of vertices with the same syndrome qubits but different times, of the form (v, t) and (v, t+1). Horizontal edges are edges connecting a pair of vertices with the same times and different syndrome qubits, of the form (v, t) and (w, t). Flag edges are edges corresponding to a fault in the X-stabilizer round which creates two adjacent erroneous data qubits; such edges connect two vertices of the same color and may be associated with a flag measurement of 1 in the X stabilizer round. Diagonal edges are edges connecting a pair of vertices with different syndrome qubits and different times, of the form (v, t) and (w, t+1).

Figure 5:
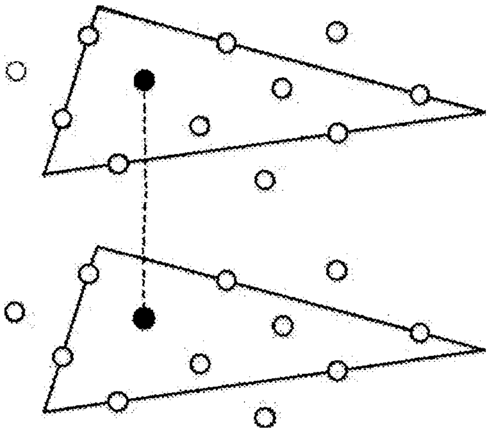
FIG. 5 is an example of an edge resulting from a potential preparation or measurement fault on a syndrome qubit, or a gate fault introducing an X gate to the syndrome qubit.

Now referring to FIG. 5, there is shown an example of an edge resulting from a potential preparation or measurement fault on a syndrome qubit, or a potential gate fault introducing an X gate to the syndrome qubit. Such a fault changes the measured outcome of the syndrome qubit in just one syndrome qubit measurement round, e.g., of syndrome qubit v in the syndrome σ(Z, 2t+1). The set of selected vertices associated with this syndrome outcome is {(v, t), (v, t+1)}; as a result only one edge is constructed, namely, the edge connecting these two vertices. This is explained in Chamberland et al., "Triangular color codes on trivalent graphs with flag qubits", *New Journal of Physics* 22, no. 2, p. 023019, 2020, which is incorporated by reference herein in its entirety.

Figure 6:
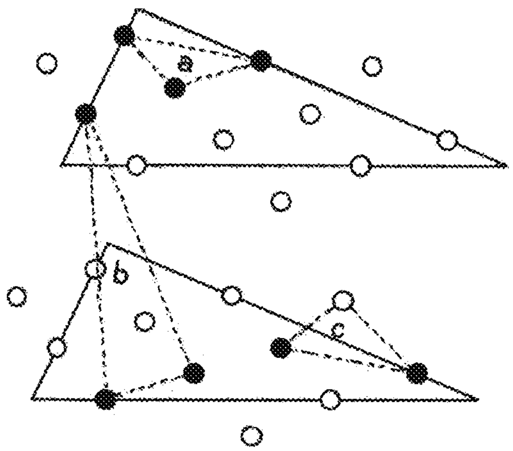
FIG. 6 is an example of edges resulting from a potential fault which introduces an X error to a single data qubit.

Now referring to FIG. 6, there is shown an example of edges resulting from a potential fault which introduces an X error to a single data qubit. In this case, edges at the boundaries of the graph are included. When a single data qubit accumulates a Pauli X-type error, the measurement outcomes for each of the surrounding syndrome qubits are either . . . , 0, 0, 1, 1, . . . or . . . , 1, 1, 0, 0, . . . . A measurement outcome of this form for a syndrome qubit v implies that there is just a single number t with the property that (v, t) is a selected vertex. In most cases, each data qubit is surrounded by three syndrome qubits, in which case the result is three selected vertices, as shown in examples (a) and (b) in FIG. 6. In example (a), the three syndrome qubits' measurement outcomes switched at the same time. In example (b), one of the syndrome qubits' measurement outcomes switched a single timestep later than those of the other two. In example (c), there is a data qubit at the boundary of the patch which is adjacent to only two syndrome qubits; as a result, edges connecting these syndrome qubits to the boundary vertex are added. This is explained in Chamberland et al., "Triangular color codes on trivalent graphs with flag qubits", *New Journal of Physics* 22, no. 2, p. 023019, 2020, which is incorporated by reference herein in its entirety.

Figure 7:
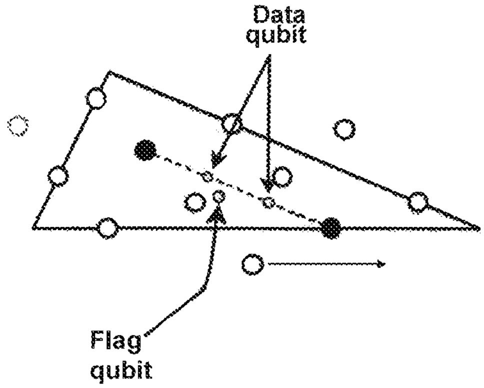
FIG. 7 is an example of an edge resulting from a potential fault in the X stabilizer round which introduces an X error that propagates to two data qubits.

Now referring to FIG. 7, there is shown an example of an edge resulting from a potential fault in the X stabilizer round at time 2t (for some number t) which introduces a Pauli X-type error that propagates to two data qubits. In this case, the measurement outcomes of two syndrome qubits marked in black (i.e., solid dots in FIG. 7) is either . . . , 0, 0, 1, 1, . . . , or . . . , 1, 1, 0, 0, . . . , with the change occurring in the Z stabilizer round at time 2t+1, and therefore results in two selected vertices (v, t) and (w, t). However, it is also true that this erroneous event would cause a measurement outcome of 1 in the X stabilizer round at time 2t in the flag qubit indicated in FIG. 7. This is explained in Chamberland et al., "Triangular color codes on trivalent graphs with flag qubits", *New Journal of Physics* 22, no. 2, p. 023019, 2020, which is incorporated by reference herein in its entirety.

To calculate the edges' weights, each edge, e, may be assigned an approximated probability $P_e$ which is equal to the sum of the probabilities of all possible single faults under the noise model which would select both endpoints of that edge. This is a first-order approximation of the true probability of both endpoints of said edge being selected under the given noise model. For the purposes of the matching, the weight of the edge may be $-\log(P_e)$.

In some embodiments, flag measurements are included, and the edges' probabilities may be modified. Consider one plaquette P and some integer t between 1 and N, inclusive.

Let F denote the configuration of flag qubits in P whose measurement outcome is 1 in the syndrome qubit measurement σ(X, 2t). If F is nontrivial, then that implies a fault occurred within plaquette P in the stabilizer circuit which produced the syndrome σ(X, 2t). The knowledge that such a fault occurred therefore makes some edges in time layer t more likely than they were before this was known. In some cases, this information is used to modify some edges in time layer t in the following way. Let Pr[F] denote the total probability of all possible fault configurations which could create the flag outcome F. To first order, Pr[F] is approximated by adding the probabilities of all single-faults which would result in F. Next, for every possible subset of data qubits in plaquette P, let $Pr[F^E_D]$ be the total probability of all single-faults which would result in F and also create Pauli X errors on the data qubits D. Then the quotient $Pr[F^E_D]/Pr[F]$ is a first-order approximation to the conditional probability $Pr[E_D|F]$, which is the probability that the data qubits D acquired Pauli X errors conditional on the observation of F. For every edge, e, which is concentrated in time layer t of the graph G and also corresponds to the data qubits error $E_D$, the substitution $P_e \rightarrow P_e+(1-P_e)(1-Pr[E_D|F])$ is performed. The graph G corresponds to the data qubits error $E_D$ in that the edge, e, being added to the graph to account for a single-fault event in the stabilizer circuit σ(X, 2t) would cause the data qubits error $E_D$.

This substitution is essentially the same as multiplying the probability $1-P_e$ that the edge, e, is not present by the factor $(1-Pr[E_D|F])$. The procedure described above is done for every plaquette, P, and every time, t.

Once the graph, G, is constructed as above, vertices may be marked on the basis of the syndrome history for which the decoding procedure is applied. Given the sequence of syndromes of the syndrome history, if the measurement of v in the syndrome σ(Z, 2t−1) differs from its measurement in σ(Z, 2t+1), then vertex (v, t) of G is marked. In other words, the same criterion is used to mark vertices as was used to find selected vertices in the construction of the graph, G. Next, three instances of the MWPM may be solved. Consider the restricted graph $G_{RB}$ whose vertices are the red and blue vertices in G, and whose edges are the edges in G connecting those vertices and with the same weights. An MWPM problem with the marked vertices and boundary vertices which are red and blue is solved to obtain a set of edges $E_{RB}$. A similar procedure is done for the pairs of colors BG and GR to obtain sets of edges $E_{BG}$ and $E_{GR}$. These three sets of edges are combined into a single set E.

The set E may be partitioned into "connected components". Herein, a connected component is defined as a sequence of edges $(v_0, v_1)$, $(v_1, v_2)$, $(v_2, v_3)$, . . . , $(v_{n-1}, v_n)$ such that either $v_0$ and $v_n$ are the same vertex (such connected components are called "cycles"), or both are boundary vertices (such connected components are called "strings"). In cases wherein the partitioning of E into connected components is not unique, one partition of E into connected components is selected at random.

For the next step of decoding, a two-dimensional matching graph may be used. This graph which may be described in terms of the graph G is an intermediate structure which is used to determine which data qubits to correct with a Pauli X-type correction. The graph G may be referred to as a three-dimensional matching graph wherein two of the dimensions are spatial, and the third dimension is temporal. The two-dimensional matching graph may have the two spatial dimensions. The two-dimensional matching graph may be a graph with one vertex for each syndrome qubit and two distinct vertices v and w connected by an edge if there are some two vertices (v, t) and (w, s) in the graph G which are connected by an edge.

Figure 8:
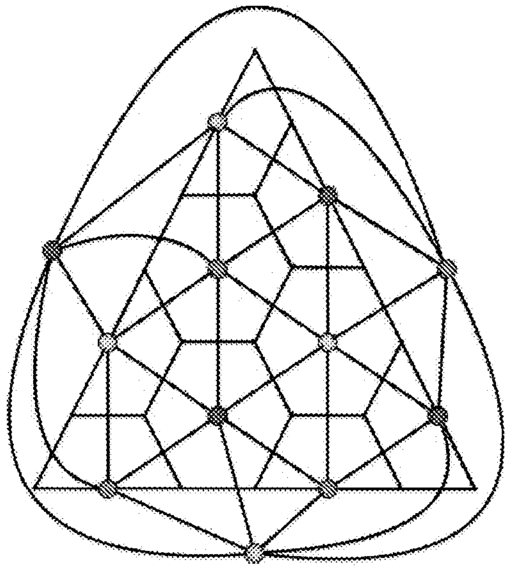
FIG. 8 is an example of a two-dimensional matching graph for code distance 5.

Now referring to FIG. 8, there is shown a two-dimensional matching graph for code distance 5. For more examples and discussion, see Section 2 of Chamberland et al., "Triangular color codes on trivalent graphs with flag qubits", *New Journal of Physics* 22, no. 2, p. 023019, 2020, which is incorporated by reference herein in its entirety.

Local lifting may be used to identify the data qubits to correct. Local lifting may be performed on each connected component C, which includes the following sequence of steps. First, a color c is selected from the set of three colors, for example {R, B, G}, where if C is a cycle the color c may be arbitrarily selected, and if C is a string then the color c is a different color from both boundary vertices $v_0$ and $v_n$ as defined elsewhere herein. Next, vertical edges of C are removed and for all other edges the time coordinate of the vertices is dropped. Then, each flag edge is replaced by a pair of horizontal edges as described in Section 2.4 of Chamberland et al., "Triangular color codes on trivalent graphs with flag qubits", *New Journal of Physics* 22, no. 2, p. 023019, 2020, which is incorporated by reference herein in its entirety. Let $S_{odd}$ be the set of edges which appear with odd multiplicity in the resulting multi-set of edges in the two-dimensional matching graph. For every vertex v of color c in the two-dimensional matching graph, a collection of triangular faces adjacent to v whose boundary matches the edges $S_{odd}$ incident to the vertex v is obtained. Let $F_{total}$ be the total set of faces in the two-dimensional matching graph which are obtained in this way. Faces in the two-dimensional matching graph correspond bijectively to data qubits, which allows for $F_{odd}$ to be readily converted to a set of data qubits on which to perform a Pauli X correction. This joint correction is called a "recovery operation".

In some embodiments, the local lifting procedure may be applied to only a subset of connected components.

Modified Union-Find Procedure

The Union-Find algorithm is a method for performing approximate MWPM to a set of marked vertices on an unweighted or weighted graph. The Union-Find algorithm is described further in Delfosse et al., "Almost-linear time decoding algorithm for topological codes", arXiv:1709.06218, 2017, which is incorporated by reference herein in its entirety. Without being limited by theory, the algorithm may improve upon other methods at least in part by using data structures chosen to minimize data lookups and query times within the algorithm, thereby achieving a time complexity which is nearly linear in the total number of vertices in the graph. The Union-Find algorithm has been studied as a candidate for the decoding of quantum error-correcting codes, primarily for the surface code (see, for example, Delfosse et al., "Almost-linear time decoding algorithm for topological codes", arXiv:1709.06218, 2017; Huang et al., "Fault-tolerant weighted union-find decoding on the toric code", *Physical Review A* 102, no. 1, p. 012419, 2020; and Das et al., "A scalable decoder micro-architecture for fault-tolerant quantum computing", arXiv:2001.06598, 2020; each of which is incorporated by reference herein in its entirety) and for other codes non-fault-tolerantly such as in Delfosse et al., "Toward a union-find decoder for quantum LDPC codes", *IEEE Transactions on Information Theory* 68, no. 5, pp. 3187-3199, 2022, which is incorporated by reference herein in its entirety. The methods and systems disclosed herein may apply the Union-Find algorithm as a subroutine in decoding the color code fault-tolerantly. For example, the Union-Find algorithm may be used as a replacement for the MWPM problem solving procedure.

The Union-Find algorithm may solve the matching problem on a graph with marked and unmarked vertices. This matching problem may be integrated into a decoding algorithm such as a Restriction Decoder. In some cases, the Union-Find algorithm may be adapted to solve a matching problem in a graph with marked, unmarked, and boundary vertices. The modification which must be made to the algorithm is in the clustering phase, as follows. In the case where the graph has boundary vertices, the clustering phase is initiated with a cluster at every boundary vertex and every marked vertex, and throughout the clustering phase, any cluster which contains a boundary vertex does not grow. At least one adaptation of the Union-Find algorithm is disclosed elsewhere herein.

The algorithm has two phases known as "clustering" and "peeling", which may be described for the case of an unweighted graph. Adapting the algorithm to a weighted graph can be done as described by Huang et al., "Fault-tolerant weighted union-find decoding on the toric code", *Physical Review A* 102, no. 1, p. 012419, 2020, which is incorporated by reference herein in its entirety.

The clustering phase as described in Delfosse et al., "Almost-linear time decoding algorithm for topological codes", arXiv:1709.06218, 2017, which is incorporated by reference herein in its entirety, involves keeping track of both "fully grown" edges and "half-grown" edges. To avoid this complication, each edge of the graph G may be bisected into two smaller edges with a new unmarked vertex introduced in the middle. A "cluster" $C=(V_C, E_C)$ is a subgraph of the whole graph G. The underlying concepts may be described in the following way:

- A vertex v in $V_C$ is a "grow vertex" of C if there are edges of the graph G incident to v which are not part of $E_C$.
- The "parity" of C is 0 if there is an even number of marked vertices in $V_C$, and 1 if there is an odd number of marked vertices in $V_C$.
- "Growing" C means the following procedure: for every grow vertex v of C, all edges incident to v are added to $E_C$ and all vertices adjacent to v are added to $V_C$.
- "Fusing" two clusters which have a vertex in common means to produce a new cluster which is the union of the two clusters.

At the beginning of the clustering phase, for every marked vertex v a single cluster with vertices {v} and no edges is created. The "clustering step" may comprise: growing all clusters which simultaneously have odd parity and also contain no boundary vertices, fusing any pairs of clusters which have a vertex in common, and updating any data structures containing information about the parity, grow vertices, and other data regarding the clusters.

The clustering phase may end when every cluster either has even parity or contains a boundary vertex. There are various ways to store the data in a way that the clustering phase can be done efficiently, though the choice may be adapted based on the hardware being used to implement the algorithm.

The peeling phase is performed separately for every cluster. For a single cluster C:

Construct a spanning tree T of C.
Set A={ }.
Until no edges in T:
  pick a leaf v of T, i.e., a vertex with only a single incident edge in T; let w denote the other vertex of T which is adjacent to v;
  remove the edge (w, v) from T;
  if v is marked, then
    add (w, v) to A, and
    switch the state of w (from unmarked to marked or from marked to unmarked).
Return the set A.

The above steps may be performed for every cluster C, and the resulting sets of edges A may be combined into a single large set, which is a matching and is then returned.

Quantum Device

Any type of quantum computers may be suitable for the technologies disclosed herein. In accordance with the description herein, suitable quantum computers may include, by way of non-limiting examples, superconducting quantum computers (qubits implemented as small superconducting circuits—Josephson junctions) (Clarke et al., "Superconducting quantum bits", *Nature* 453, no. 7198, pp. 1031-1042, 2008), which is incorporated by reference herein in its entirety); trapped ion quantum computers (qubits implemented as states of trapped ions) (Kielpinski et al., "Architecture for a large-scale ion-trap quantum computer", *Nature* 417, no. 6890, pp. 709-711, 2002), which is incorporated by reference herein in its entirety); optical lattice quantum computers (qubits implemented as states of neutral atoms trapped in an optical lattice) (Deutsch et al., "Quantum computing with neutral atoms in an optical lattice", *Fortschritte der Physik: Progress of Physics* 48, no. 9-11, pp. 925-943, 2000), which is incorporated by reference herein in its entirety); spin-based quantum dot computers (qubits implemented as the spin states of trapped electrons) (Imamoḡlu et al., "Quantum information processing using quantum dot spins and cavity QED", *Physical Review Letters* 83, no. 20, p. 4204, 1999), which is incorporated by reference herein in its entirety); spatial-based quantum dot computers (qubits implemented as electron positions in a double quantum dot) (Fedichkin et al., "Novel coherent quantum bit using spatial quantization levels in semiconductor quantum dot", arXiv:quant-ph/0006097, 2000), which is incorporated by reference herein in its entirety); coupled quantum wires (qubits implemented as pairs of quantum wires coupled by quantum point contact) (Bertoni et al., "Quantum logic gates based on coherent electron transport in quantum wires", *Physical Review Letters* 84, no. 25, p. 5912, 2000), which is incorporated by reference herein in its entirety); nuclear magnetic resonance quantum computers (qubits implemented as nuclear spins and probed by radio waves) (Cory et al., "Nuclear magnetic resonance spectroscopy: An experimentally accessible paradigm for quantum computing", arXiv:quant-ph/9709001, 1997), which is incorporated by reference herein in its entirety); solid-state NMR Kane quantum computers (qubits implemented as the nuclear spin states of phosphorus donors in silicon) (Kane, "A silicon-based nuclear spin quantum computer", *Nature* 393, no. 6681, pp. 133-137, 1998), which is incorporated by reference herein in its entirety); electrons-on-helium quantum computers (qubits implemented as electron spins) (Lyon, "Spin-based quantum computing using electrons on liquid helium", arXiv:cond-mat/0301581, 2006), which is incorporated by reference herein in its entirety); cavity quantum electrodynamics-based quantum computers (qubits implemented as states of trapped atoms coupled to high-finesse cavities) (Burell, "An Introduction to Quantum Computing using Cavity QED concepts", arXiv:1210.6512, 2012), which is incorporated by reference herein in its entirety); molecular magnet-based quantum computers (qubits implemented as spin states) (Leuenberger et al., "Quantum Computing in Molecular Magnets", arXiv: cond-mat/0011415, 2001), which is incorporated by reference herein in its entirety); fullerene-based ESR quantum computers (qubits implemented as electronic spins of atoms or molecules encased in fullerenes) (Harneit, "Spin Quantum Computing with Endohedral Fullerenes", arXiv: 1708.09298, 2017, which is incorporated by reference herein in its entirety); linear optical quantum computers (qubits implemented as processing states of different modes of light through linear optical elements such as mirrors, beam splitters, and phase shifters) (Knill et al., "Efficient linear optics quantum computation", arXiv:quant-ph/0006088, 2000, which is incorporated by reference herein in its entirety); diamond-based quantum computers (qubits implemented as electronic or nuclear spins of nitrogen-vacancy centres in diamond) (Nizovtsev et al., "A quantum computer based on NV centers in diamond: optically detected nutations of single electron and nuclear spins", *Optics and Spectroscopy* 99, no. 2, pp. 233-244, 2005, which is incorporated by reference herein in its entirety); Bose-Einstein condensate-based quantum computers (qubits implemented as two-component BECs) (Byrnes et al., "Macroscopic quantum computation using Bose-Einstein condensates", arXiv:quantum-ph/1103.5512, 2011, which is incorporated by reference herein in its entirety); transistor-based quantum computers (qubits implemented as semiconductors coupled to nanophotonic cavities) (Sun et al., "A single-photon switch and transistor enabled by a solid-state quantum memory", arXiv:quant-ph/1805.01964, 2018, which is incorporated by reference herein in its entirety); rare-earth-metal-ion-doped inorganic crystal-based quantum computers (qubits implemented as atomic ground state hyperfine levels in rare-earth-ion-doped inorganic crystals) (Ohlsson et al., "Quantum computer hardware based on rare-earth-ion-doped inorganic crystals", *Optics Communications* 201, no. 1-3, pp. 71-77, 2002, which is incorporated by reference herein in its entirety) and metal-like carbon nanospheres based quantum computers (qubits implemented as electron spins in conducting carbon nanospheres) (Nifridi et al., "Room temperature manipulation of long lifetime spins in metallic-like carbon nanospheres", arXiv:cond-mat/1611.07690, 2016, which is incorporated by reference herein in its entirety).

Classical Computer

In some cases, the systems, media, networks, and methods described herein comprise a classical computer, or use of the same. In some cases, a classical computer may comprise a digital computer. In some cases, the classical computer includes one or more hardware central processing units (CPUs) that carry out the classical computer's functions. In some cases, the classical computer further comprises an operating system (OS) configured to perform executable instructions. In some cases, the classical computer is connected to a computer network. In some cases, the classical computer is connected to the Internet such that it accesses the World Wide Web. In some cases, the classical computer is connected to a cloud computing infrastructure. In some cases, the classical computer is connected to an intranet. In some cases, the classical computer is connected to a data storage device.

In accordance with the description herein, suitable classical computers may include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Smartphones may be suitable for use with methods and systems described herein. Select televisions, video players, and digital music players, in some cases with computer network connectivity, may be suitable for use in the systems and methods described herein. Suitable tablet computers may include those with booklet, slate, and convertible configurations.

In some cases, the classical computer includes an operating system configured to perform executable instructions. The operating system may be, for example, software, including programs and data, which manages the device's hardware and provides services for execution of applications. Suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Suitable personal computer operating systems may include, by way of non-limiting examples, Microsoft® Windows®, Apple® Mac OS X®, UNIX®, and UNIX-like operating systems such as GNU/Linux®. In some cases, the operating system is provided by cloud computing. Suitable mobile smart phone operating systems may include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Suitable media streaming device operating systems may include, by way of non-limiting examples, Apple TV®, Roku®, Boxee®, Google TV®, Google Chromecast®, Amazon Fire®, and Samsung® HomeSync®. Suitable video game console operating systems may include, by way of non-limiting examples, Sony® PS3®, Sony® PS4®, Microsoft® Xbox 360®, Microsoft® Xbox One®, Nintendo® Wii®, Nintendo® Wii U®, and Ouya®.

In some cases, the classical computer includes a storage and/or memory device. In some cases, the storage and/or memory device is one or more physical apparatuses used to store data or programs on a temporary or permanent basis. In some cases, the device is volatile memory and uses power to maintain stored information. In some cases, the device is non-volatile memory and retains stored information when the classical computer is not powered. In some cases, the non-volatile memory comprises flash memory. In some cases, the non-volatile memory comprises dynamic random-access memory (DRAM). In some cases, the non-volatile memory comprises ferroelectric random-access memory (FRAM). In some cases, the non-volatile memory comprises phase-change random-access memory (PRAM). In some cases, the device is a storage device including, by way of non-limiting examples, CD-ROMs, DVDs, flash memory devices, magnetic disk drives, magnetic tapes drives, optical disk drives, and cloud computing based storage. In some cases, the storage and/or memory device is a combination of devices such as those disclosed herein.

In some cases, the classical computer includes a display to send visual information to a user. In some cases, the display is a cathode ray tube (CRT). In some cases, the display is a liquid crystal display (LCD). In some cases, the display is a thin film transistor liquid crystal display (TFT-LCD). In some cases, the display is an organic light emitting diode (OLED) display. In some cases, an OLED display is a passive-matrix OLED (PMOLED) or active-matrix OLED (AMOLED) display. In some cases, the display is a plasma display. In some cases, the display is a video projector. In some cases, the display is a combination of devices such as those disclosed herein.

In some cases, the classical computer includes an input device to receive information from a user. In some cases, the input device is a keyboard. In some cases, the input device is a pointing device including, by way of non-limiting examples, a mouse, trackball, track pad, joystick, game controller, or stylus. In some cases, the input device is a touch screen or a multi-touch screen. In some cases, the input device is a microphone to capture voice or other sound input. In some cases, the input device is a video camera or other sensor to capture motion or visual input. In some cases, the input device is a Kinect®, Leap Motion®, or the like. In some cases, the input device is a combination of devices such as those disclosed herein.

Now referring to FIG. 1, there is shown a diagram of an example system for quantum error correction using the clustering procedure with a message-passing subroutine for a color code. The system comprises a digital computer 100 and a quantum computer 104. The digital computer 100 comprises at least one processing device 106, a display device 108, an input device 110, communication ports 114 and a memory 112 comprising a computer program comprising the clustering procedure with a message-passing subroutine instructions executable by the processing device. In some embodiments, the memory 112 comprises quantum computer instructions. The digital computer 100 may be of various types, such as any digital computer disclosed elsewhere herein.

Still referring to FIG. 1, the quantum computer 104 comprises a quantum chip 120. The quantum chip 120 comprises a color code. In some embodiments, the quantum computer 104 comprises a readout control system 122 for quantum measurements readouts. The quantum computer 104 is operatively connected to the digital computer 100 by way of connection between the readout control system 122 and the communication ports 114. The quantum computer 104 may comprise any quantum computer such as any quantum device disclosed elsewhere herein.

In some embodiments, the color code is a two-dimensional color code. The color code includes plaquettes having syndrome qubits, data qubits, and quantum gates acting on the syndrome qubits and the data qubits. The color code may be of various types, such as any color code disclosed elsewhere herein. In some embodiments, the color code includes flag qubits.

In some embodiments, the digital computer 100 is for providing instructions to the quantum computer 104 using communication ports 114 and readout control system 122.

In some embodiments, the system for quantum error correction includes a processing unit not shown in FIG. 1. The processing unit may be of various types such as a field-programmable gate array (FPGA), an application-specific integrated circuit (ASIC), a graphics processing unit (GPU), a tensor processing unit (TPU), or a tensor streaming processor (TSP).

Figure 2:
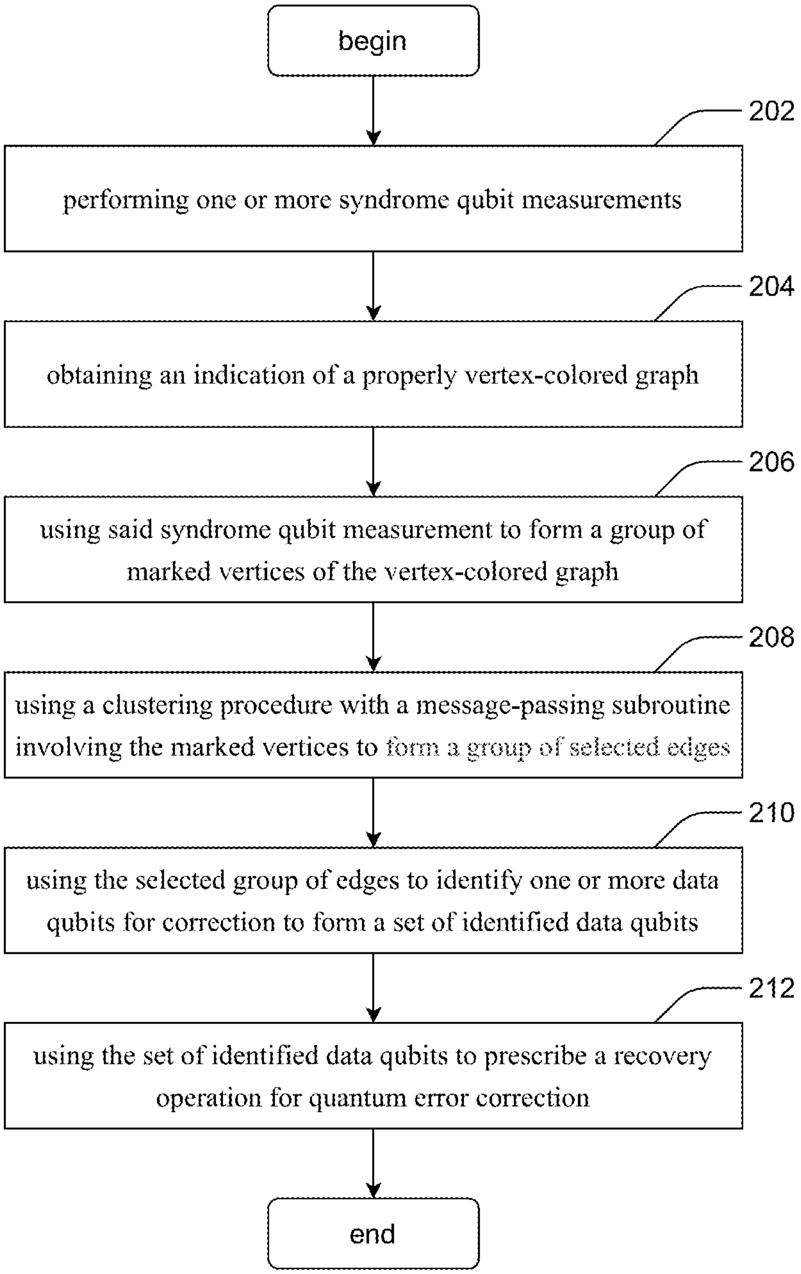
FIG. 2 is a flowchart of an example method for quantum error correction using the clustering procedure with a message-passing subroutine for a color code.

Now referring to FIG. 2, there is shown a flowchart of an example method for quantum error correction of Pauli X-type errors on the data qubits using the clustering procedure with a message-passing subroutine for a color code. The clustering procedure may be the main element in solving the MWPM problem. It involves iteratively growing clusters in the graph until one or more global stopping criteria are met, and then performing local operations within the clusters to obtain a matching. The required global coordination may make the clustering procedure computationally expensive, while using message-passing among nodes of the graph to form the clusters may help to take the load off of a global coordinator for the algorithm. The Union-Find procedure is one particular implementation of a clustering procedure with a message-passing subroutine. It specifies the data structure which is used, and the fundamental operations used during the procedure which are called "union" and "find". The Union-Find procedure may be the Union-Find procedure described elsewhere herein.

The Union-Find algorithm as described in the literature solves the matching problem on a graph with marked and unmarked vertices. However, a step in creating an end-to-end working system to decode the color code is to adapt the Union-Find algorithm to solve the matching problem in a graph with marked, unmarked, and boundary vertices. These marked, unmarked, and boundary vertices may be used as inputs to the Restriction Decoder. The Union-Find algorithm as described elsewhere herein includes this modification.

According to processing operation 202, one or more syndrome qubit measurements are performed. The syndrome qubits are part of a color code used for quantum error correction. The history of syndrome qubit measurements provides information about how the joint data qubit state deviates from the codespace. This information may be used to infer which errors have afflicted the data qubits so that they can be corrected. In some embodiments, the color code comprises flag qubits. In some embodiments, both the flag qubit and the syndrome qubit measurements are performed.

In the embodiment where the color code comprises flag qubits, the syndrome qubit measurements and the flag qubit measurements are performed on a quantum computer. The quantum computer may be of various types such as any quantum computer disclosed elsewhere herein, for example the quantum computer 104 disclosed herein with respect to FIG. 1. The qubit measurements may be performed and provided to the classical computer 100 using the readout control system 122 and stored in the memory 112.

According to processing operation 204, an indication of a properly vertex-colored graph is obtained. The vertex-colored graph has vertices and weighted edges. In some embodiments, the vertices are colored using three colors. The colors of the vertices are inherited from the color code plaquettes. Each vertex represents a location of a syndrome qubit and a measurement time, or a boundary of the color code and a measurement time. The weighted edges represent patterns of erroneous events. The weights of the edges are representative of the probabilities of the patterns of erroneous events.

In some embodiments, for a two-dimensional color code, given the syndrome qubit measurements $\sigma(Z, 1)$; $\sigma(X, 2)$; $\sigma(Z, 3)$; . . . ; $\sigma(Z, 2N-1)$; $\sigma(X, 2N)$; $\sigma(Z, 2N+1)$ for some positive integer N, where $\sigma(Z, -)$ denotes a stabilizer measurement of type Z, and $\sigma(X, -)$ denotes a stabilizer measurement of type X (in both embodiments, including both syndrome qubit and flag qubit measurements) a vertex-colored graph G is obtained. The vertex-colored graph G may have one vertex for every ordered pair (v, t) wherein v spans all syndrome qubit measurement locations and t spans all positive integers between 1 and N, inclusive. Boundary vertices $(v_R, t)$, $(v_B, t)$, and $(v_G, t)$ are correspond to the red, blue, and green boundaries, respectively. For every vertex (v, t) in the graph G wherein v corresponds to a syndrome qubit measurement location v, the vertex (v, t) is assigned the color of the color code plaquette containing v, and for every vertex (v, t) in the graph G wherein v corresponds to one of the boundaries, the vertex (v, t) is assigned the color of the boundary.

The edges of the graph G represent patterns of erroneous events with edges' weights representing the probabilities of the patterns of erroneous events. For each possible single erroneous event F, the syndrome qubit measurement outcome $H(F)=\sigma(Z, 1)$; $\sigma(X, 2)$; $\sigma(Z, 3)$; . . . ; $\sigma(Z, 2N-1)$; $\sigma(X,$ 2N); σ(Z, 2N+1), which results from this erroneous event, may be simulated. This syndrome outcome SH(F) determines a set of selected vertices, SV(H(F)), which is the set of all vertices (v, t) with the property that the measurement outcomes of v in σ(Z, 2t−1) and σ(Z, 2t+1) are different from one another. This set of selected vertices in turn determines a set of edges E(SV(H(F))) as follows: for every pair of distinct vertices in the set of selected vertices, an edge connecting the pair is constructed. In other words, two vertices of the graph G are connected by an edge if there exists an erroneous event F such that SV(H(F)) contains both vertices.

The noise afflicting the syndrome extraction circuit may be modeled in various ways. In some embodiments, the noise is modeled using a user input. In some embodiments, the noise is modeled using experimental data. In some embodiments, the noise is modeled using a machine learning method. In these cases, the graph edges and probabilities of these edges are constructed directly from the model in a way which depends on the type of model used. For example, given n experimentally generated syndrome histories $H_1$, $H_2, \ldots, H_n$, one way to construct the edges and weights is to add an edge e to the graph if and only if $SV(H_i)$ contains both endpoints of e, for some index i. Each edge e is assigned a weight $-\log(P_e)$ where $P_e$ is the fraction of indices i such that $SV(H_i)$ contains both endpoints of e.

In some embodiments, a model for the noise afflicting the syndrome extraction circuit, wherein single-fault events occur with various probabilities are independent and only introduce errors locally, is used. An example of such a noise model is a depolarizing channel, wherein the operations of single-qubit gates, two-qubit gates, preparation, measurement, and waiting have separate fixed probabilities of incurring random Pauli errors on the qubits acted upon by the operation.

Given the noise model, an edge representative of an erroneous event resulting from a single fault may be constructed between two vertices in the graph G. This creates a lattice-like structure of edges in the bulk of the graph, and similar edges at the boundaries of the graph may be additionally included.

In some embodiments, in the case of a depolarizing noise channel, different types of erroneous events result in edges of vertical, horizontal, diagonal, and "flag" edges. Vertical edges are edges connecting a pair of vertices with the same syndrome qubits but different times, of the form (v, t) and (v, t+1). Horizontal edges are edges connecting a pair of vertices with the same times and different syndrome qubits, of the form (v, t) and (w, t). Flag edges are edges corresponding to a fault in the X-stabilizer round which creates two adjacent erroneous data qubits; such edges connect two vertices of the same color and may be associated with a flag measurement of 1 in the X stabilizer round. Diagonal edges are edges connecting a pair of vertices with different syndrome qubits and different times, of the form (v, t) and (w, t+1). Edges of various types are shown in FIG. 5, FIG. 6, and FIG. 7 as described elsewhere herein.

In some embodiments, each edge e may be assigned an approximated probability $P_e$ which is equal to the sum of the probabilities of all possible single faults under the noise model which would select both endpoints of that edge. This is a first-order approximation of the true probability of both endpoints of said edge being selected under the given noise model. For the purposes of the matching, the weight of each edge e may be $-\log(P_e)$.

In some embodiments, the edges' weights are further approximated. For example, if the specific hardware implementation supports only whole-number edge weights, then the edge weights determined by the algorithm may be scaled up by a common constant factor and then rounded to the nearest whole number.

In some embodiments where the color code comprises flag qubits, the flag qubit measurements' results are used to modify the weights of the edges. To modify the weights of the edges at decoding time the probabilities of the patterns of erroneous events are updated using the flag qubit measurements. A flag qubit measurement resulting in 1 may indicate a fault occurring within a plaquette which contains said flag qubit. Let F denote the configuration of flag qubits in a plaquette P whose measurement outcome is 1 in the syndrome qubit measurement σ(X, 2t). If F is nontrivial, then that implies a fault occurred within plaquette P in the stabilizer circuit which produced the syndrome σ(X, 2t). The knowledge that such a fault occurred therefore makes some edges in time layer t more likely than they were before this was known. In some cases, this information is used to modify some edges in time layer t in the following way. Let Pr[F] denote the total probability of all possible fault configurations which could create the flag outcome F. To first order, Pr[F] is approximated by adding the probabilities of all single-faults which would result in F. Next, for every possible subset of data qubits in plaquette P, let $\Pr[F\hat{}E_D]$ be the total probability of all single-faults which would result in F and also create Pauli X errors on the data qubits D. Then the quotient $\Pr[F\hat{}E_D]/\Pr[F]$ is a first-order approximation of the conditional probability $\Pr[E_D|F]$, which is the probability that the data qubits D acquired X errors conditional on the observation of F. For every edge e which is entirely concentrated in time layer t of the graph G and also corresponds to the data qubit error $E_D$, the substitution $P_e \rightarrow P_e+(1-P_e)(1-\Pr[E_D|F])$ is performed. Herein, "corresponds" refers to the edge e being added to the graph to account for a single-fault event in the stabilizer circuit which produced the syndrome σ(X, 2t) which would cause the data qubit error $E_D$. This substitution is essentially the same as multiplying the probability $1-P_e$ that edge e is not present by the factor $(1-\Pr[E_D|F])$. The procedure described above is done for every plaquette P and every time t.

The indication of the vertex-colored graph may be of various types. In some embodiments, the indication of the vertex-colored graph is a matrix with rows and columns representing the graph's vertices and the matrix's entries representing the weights of the edges and an array of vertices' labels with attached colors.

The indication of the vertex-colored graph may be obtained in various ways. In some embodiments, the indication of the vertex-colored graph is obtained using a digital computer such as any digital computer 100 disclosed herein with respect to FIG. 1. In some embodiments, the indication of the vertex-colored graph is stored in the memory 112 of the digital computer 100. In another embodiment, the indication of the vertex-colored graph is obtained from a remote processing unit operatively coupled with the digital computer 100.

Still referring to FIG. 2 and according to processing operation 206, a group of marked vertices of the vertex-colored graph is formed using the syndrome qubit measurements. The vertex (v, t) is marked if the syndrome qubit measurement of v at time 2t+1 differs from the syndrome qubit measurement of v at time 2t−1.

According to processing step 208, a group of selected edges involving the marked vertices is formed using the clustering procedure with a message-passing subroutine.

The formed group of selected edges forms cycles or strings whose endpoints are vertices representative of the boundary of the color code.

The clustering procedure with a message-passing subroutine involving the marked vertices is used to solve the MWPM problem. For each pair PC of colors from the full group of three colors the subgraph $G_C$ of the full vertex-colored graph G comprising the vertices of G whose color is in PC and all edges connecting them is selected, and the clustering procedure with a message-passing subroutine is used to approximately solve the MWPM problem on said subgraph with marked vertices being the set of vertices in M with color in PC (where M is the set of marked vertices in G).

Figure 3:
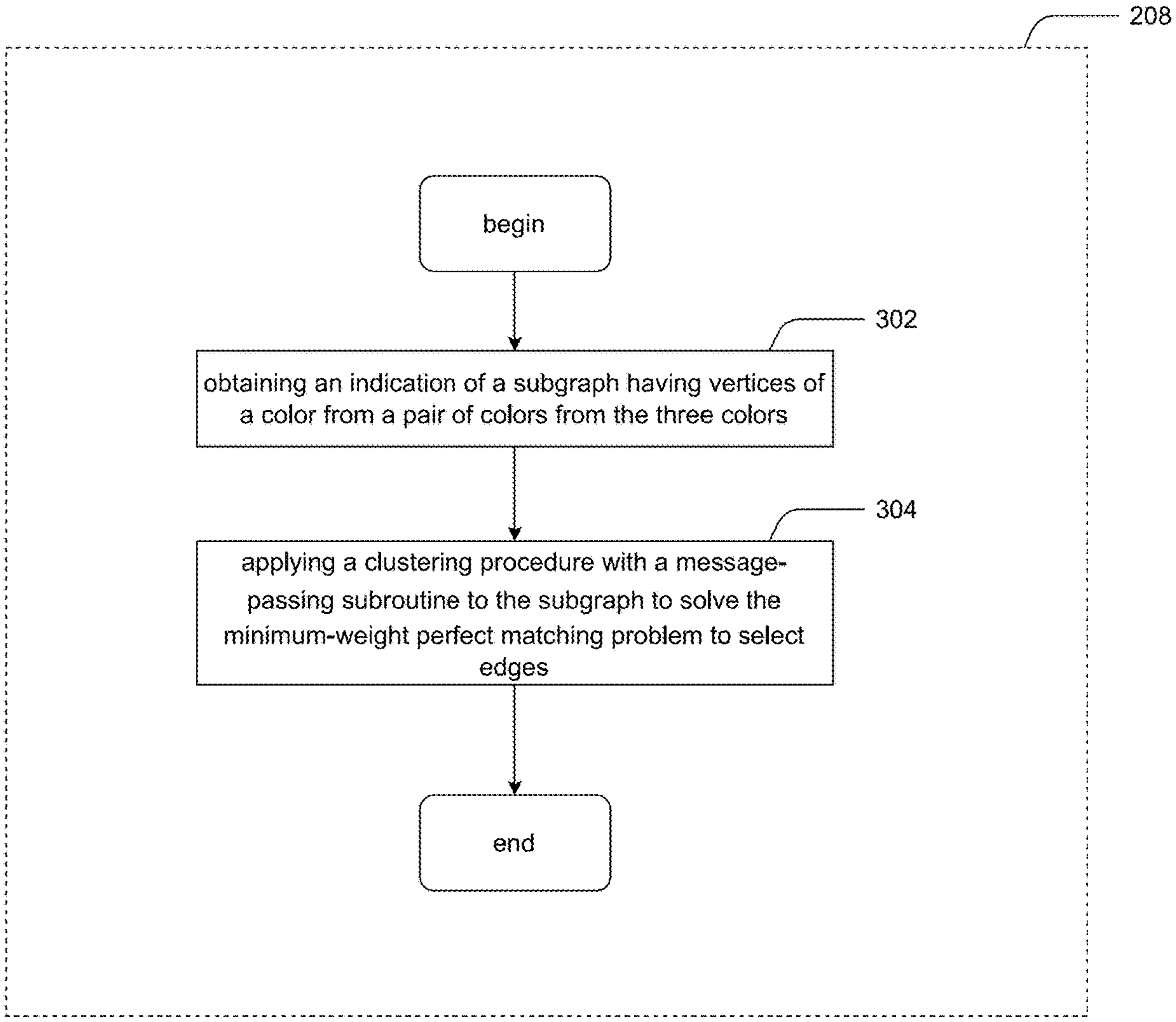
FIG. 3 is a flowchart of an example procedure for selecting edges.

Now referring to FIG. 3, there is shown a flowchart of an example procedure for forming a group of selected edges.

According to processing operation 302, an indication of a subgraph having vertices of a color from a pair of colors from the three colors is obtained.

The indication of the subgraph may be of various types. In some embodiments, the indication of the subgraph is a matrix with rows and columns representing the subgraph's vertices and the matrix's entries representing the weights of the edges, and an array of vertices' labels with attached colors.

The indication of the subgraph may be obtained in various ways. In some embodiments, the indication of the subgraph is obtained using a digital computer such as any digital computer 100 disclosed herein with respect to FIG. 1. In some embodiments, the indication of the subgraph is stored in the memory 112 of the digital computer 100. In another embodiment, the indication of the subgraph is obtained from a remote processing unit operatively coupled with the digital computer 100.

According to processing operation 304, a clustering procedure with a message-passing subroutine is applied to the obtained subgraph having the marked vertices of a color from the pair of colors from the three colors in order to solve the MWPM problem. The clustering procedure is the main element in solving the MWPM problem. It involves iteratively growing clusters in the graph until one or more global stopping criteria are met, and then performing local operations within the clusters to obtain a matching. The required global coordination may make the clustering procedure computationally expensive, while using message-passing among nodes of the graph to form the clusters may help to take the load off of a global coordinator for the algorithm. The Union-Find procedure is one particular implementation of a clustering procedure with a message-passing subroutine. It specifies the data structure which is used, and the fundamental operations used during the procedure which are called "union" and "find". The Union-Find procedure may be the Union-Find procedure described elsewhere herein.

The Union-Find algorithm as described in the literature solves the matching problem on a graph with marked and unmarked vertices. However, a step in creating an end-to-end working system to decode the color code is to adapt the Union-Find algorithm to solve the matching problem in a graph with marked, unmarked, and boundary vertices. These marked, unmarked, and boundary vertices may be used as inputs to the Restriction Decoder. The Union-Find algorithm as described elsewhere herein includes this modification.

The solutions of each of the MWPM problems identifies the edges to be selected.

Now referring back to FIG. 2 and according to processing operation 210, one or more data qubits for correction are identified using the group of selected edges to form a set of identified data qubits.

In some embodiments, the set E is partitioned into "connected components". Herein, a connected component is defined as a sequence of edges $(v_0, v_1)$, $(v_1, v_2)$, $(v_2, v_3)$, . . . , $(v_{n-1}, v_n)$ such that either $v_n$ and $v_n$ are the same vertex (such connected components are called "cycles"), or both are boundary vertices (such connected components are called "strings"). In cases where the partitioning of E into connected components is not unique, one partition of E into connected components is selected at random.

In some embodiments, a two-dimensional matching graph may be used. This graph which may be described in terms of the graph G is an intermediate structure which may be used to determine which data qubits to correct with a Pauli X-type correction. The graph G may be referred to as a "three-dimensional matching graph" wherein two of the dimensions are spatial, and the third dimension is temporal. The two-dimensional matching graph may have only the two spatial dimensions. The two-dimensional matching graph is a graph with one vertex for each syndrome qubit and one vertex for each boundary of the color code, and wherein two distinct vertices v and w are connected by an edge if there are two vertices (v, t) and (w, s) in the graph G which are connected by an edge.

In some embodiments, local lifting may be used to identify the data qubits for correction. Local lifting may be performed on each connected component C, which includes the following sequence of steps. First, a color c is selected from the set of three colors, for example {R, B, G}, where if C is a cycle the color c may be arbitrarily selected, and if C is a string then the color c is a different color from both boundary vertices $v_0$ and $v_n$ as defined elsewhere herein. Next, the vertical edges of C are removed and for all other edges the time-coordinate of the vertices is dropped. Then, each flag edge is replaced by a pair of horizontal edges as described in Section 2.4 of Chamberland et al., "Triangular color codes on trivalent graphs with flag qubits", *New Journal of Physics* 22, no. 2, p. 023019, 2020, which is incorporated by reference herein in its entirety. Let $S_{odd}$ be the set of edges which appear with odd multiplicity in the resulting multi-set of edges in the two-dimensional matching graph. Finally, for every vertex v of color c in the two-dimensional matching graph, a collection of triangular faces adjacent to v whose boundary matches the edges $S_{odd}$ incident to the vertex v is obtained. Let $F_{total}$ be the total set of faces in the two-dimensional matching graph which are obtained in this way. Faces in the two-dimensional matching graph correspond bijectively to data qubits, which allows for $F_{odd}$ to be readily converted to a set of data qubits on which to perform a Pauli X correction. This joint correction is called the "recovery operation".

In some embodiments, the local lifting procedure may be applied to only a subset of connected components, for example, if a recovery operation is to be extracted from connected components which are supported in time layers t+1, . . . , N−t for some t (so as to mitigate the effect of measurement errors at the beginning and end of the syndrome qubit measurement process). More details can be found in Chamberland et al., "Triangular color codes on trivalent graphs with flag qubits", *New Journal of Physics* 22, no. 2, p. 023019, 2020, which is incorporated by reference herein in its entirety.

Still referring to FIG. 2 and according to processing operation 212, a recovery operation for quantum error correction is prescribed using said identified data qubits. Said recovery operation comprises applying to each of the said identified data qubits one of the four Pauli operations I, X, Y, and Z.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method for quantum error correction on a quantum computer, the quantum computer comprising one or more syndrome qubits and one or more data qubits, the method comprising:

(a) performing one or more measurements of said one or more syndrome qubits;

(b) obtaining an indication of a vertex-colored graph, said vertex-colored graph having: (i) one or more vertices, wherein said one or more vertices are each: representative of a location of a syndrome qubit within said one or more syndrome qubits and a measurement time or representative of a boundary of a color code, and (ii) one or more weighted edges representing one or more patterns of erroneous events;

(c) forming a group of marked vertices from said one or more vertices of said vertex-colored graph based at least in part on said one or more measurements;

(d) forming a group of selected edges based at least in part on use of a clustering procedure with a message-passing subroutine involving a plurality of marked vertices of said group of marked vertices;

(e) identifying at least a subset of said one or more data qubits for correction, wherein said subset is identified based at least in part on said group of selected edges, wherein said identifying comprises local lifting; and (f) prescribing a recovery operation for quantum error correction based at least in part on said subset of said one or more data qubits.

2. The method of claim 1, wherein weights of said one or more weighted edges are representative of the probabilities of said one or more patterns of erroneous events.

3. The method of claim 1, further comprising receiving a selection of weights of said one or more weighted edges from a user input.

4. The method of claim 1, further comprising selecting weights of said one or more weighted edges using a noise channel from experiments.

5. The method of claim 1, further comprising selecting weights of said one or more weighted edges using a machine learning method.

6. The method of claim 1, wherein said color code further comprises one or more flag qubits, further wherein (a) comprises performing measurements of said one or more flag qubits.

7. The method of claim 6, further comprising modifying weights of said one or more weighted edges using results of said measurements of said one or more flag qubits.

8. The method of claim 7, wherein said modifying of said weights of said one or more weighted edges comprises updating a set of probabilities of one or more patterns of erroneous events using said measurements of said one or more flag qubits.

9. The method of claim 8, wherein a flag qubit measurement of said measurements of said one or more flag qubits indicates a fault occurring within a plaquette which contains said flag qubit.

10. The method of claim 1, wherein said vertex-colored graph comprises three colors inherited from a color code plaquette.

11. The method of claim 10, wherein (d) comprises for each pair of colors of said three colors:

(i) obtaining an indication of a subgraph having vertices of said colors of said pair; and (ii) applying said clustering procedure with said message-passing subroutine to said subgraph to solve a minimum-weight perfect matching problem to select edges.

12. The method of claim 11, wherein at (ii) each of said vertices representative of said boundary of said color code is used.

13. The method of claim 1, wherein said group of selected edges form cycles or form strings with endpoints being vertices representative of said boundary of said color code.

14. The method of claim 1, wherein weights of said one or more weighted edges are approximated.

15. A system for quantum error correction using a clustering procedure with a message-passing subroutine for a color code, the system comprising:

(a) a non-classical computer having (i) a quantum chip comprising a color code comprising one or more syndrome qubits, one or more data qubits, and (ii) a control readout system; and (b) a digital computer operatively coupled to the quantum chip, the digital computer comprising a memory having instructions to at least instruct said non-classical computer to perform one or more measurements of said one or more syndrome qubits; obtain an indication of a vertex-colored graph; form a group of marked vertices from said vertex-colored graph; form a group of selected edges; form with local lifting a set of identified data qubits; prescribe a recovery operation for quantum error correction; and instruct said quantum chip to carry out said recovery operation.

16. The system of claim 15, wherein said quantum chip further comprises one or more flag qubits.

17. The system of claim 15, further comprising a processing unit operatively coupled with said non-classical computer and said digital computer, said processing unit comprising at least one member of the group consisting of a field-programmable gate array (FPGA), an application-specific integrated circuit (ASIC), a graphics processing unit (GPU), a tensor processing unit (TPU), and a tensor streaming processor (TSP).

* * * * *